United States Patent [19]

Osterday

[11] Patent Number: 4,570,283
[45] Date of Patent: Feb. 18, 1986

[54] VARIABLE REACH WINDSHIELD WIPER SYSTEM

[75] Inventor: John R. Osterday, Dayton, Ohio

[73] Assignee: General Motors Corporation, Detroit, Mich.

[21] Appl. No.: 706,789

[22] Filed: Feb. 28, 1985

[51] Int. Cl.[4] .............................................. B60S 1/26
[52] U.S. Cl. ................................................ 15/250.21
[58] Field of Search ........... 15/250.13, 250.21, 250.23, 15/250.29, 250.3, 250.35

[56] References Cited

U.S. PATENT DOCUMENTS

| | | | |
|---|---|---|---|
| 864,741 | 8/1907 | Himrod | 15/250.29 X |
| 2,629,891 | 3/1953 | Greene | 15/250.21 |
| 3,831,220 | 8/1974 | Gmeiner et al. | 15/250.21 |
| 3,831,221 | 8/1974 | Gmeiner et al. | 15/250.21 |
| 4,418,440 | 12/1983 | Sigety, Jr. | 15/250.21 |
| 4,447,928 | 5/1984 | Schüch et al. | 15/250.21 |

FOREIGN PATENT DOCUMENTS 633017  10/1927  France .............................. 15/250.23

Primary Examiner—Peter Feldman
Attorney, Agent, or Firm—Saul Schwartz

[57] ABSTRACT

A windshield wiper system includes a transmission shaft on a vehicle body rotatable about an axis thereof through a wipe arc, a drive plate on the transmission shaft perpendicular to the axis, a wiper support arm rotatable with the drive plate and radially shiftable relative to the axis, a scissors linkage pivoted at one end in the transmission shaft and connected at the opposite end to the support arm, and a cam channel on the vehicle body in which is received a follower connected to the scissors linkage at a control pivot of the latter between the ends thereof. As the transmission shaft angularly oscillates, the drive plate and wiper arm and the latter, in turn, angularly oscillates the scissors linkage, the cam channel causes the follower to radially displace the scissors linkage control pivot so that the scissors linkage expands and contracts and concurrently radially extends and retracts the wiper arm thereby to vary the radial reach thereof.

4 Claims, 5 Drawing Figures

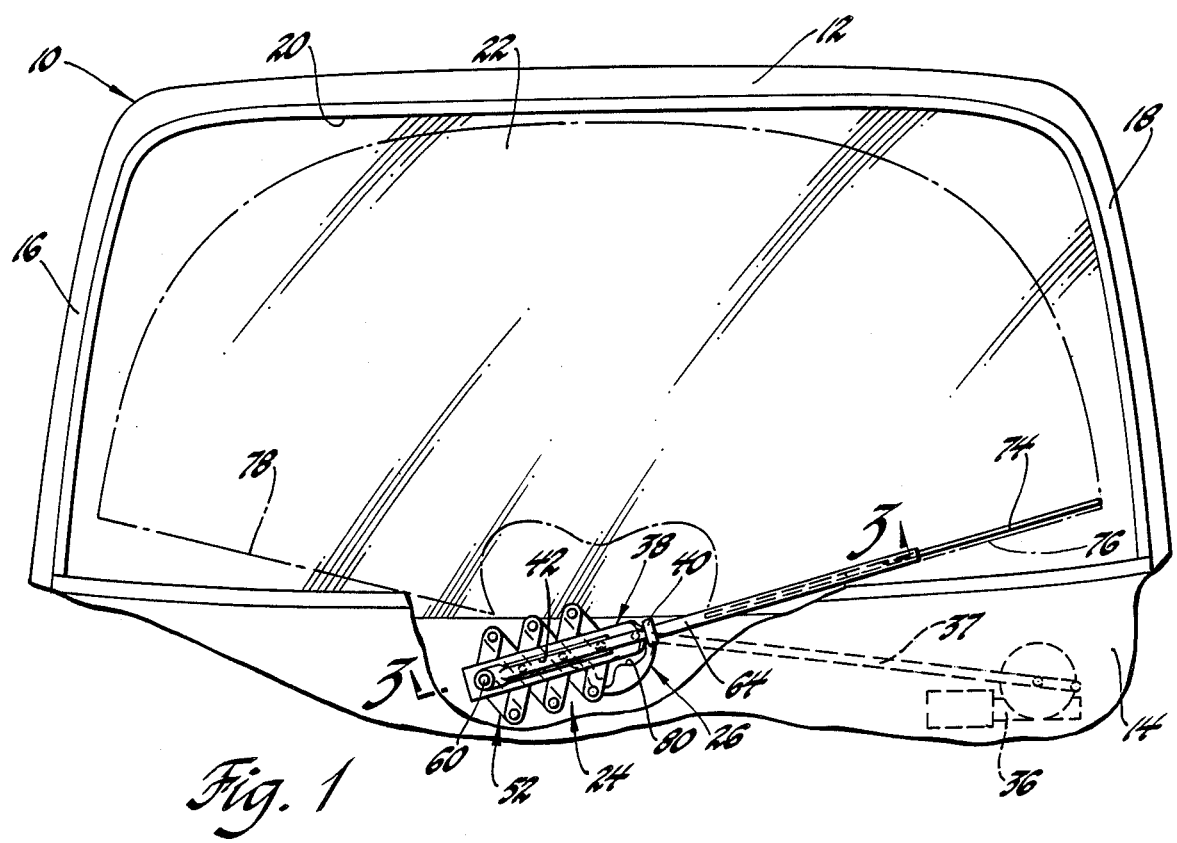

VARIABLE REACH WINDSHIELD WIPER SYSTEM

BACKGROUND OF THE INVENTION

1. Field of the Invention

This invention relates generally to vehicle windshield wiper systems and, more particularly, to a system wherein the radial reach of the wiper blade support arm varies during the angular stroke of the arm.

2. Description of the Prior Art

Efforts to simplify vehicle windshield wiper systems have led to proposals wherein a single wiper blade support arm is centrally supported below the windshield and oscillated through a wiping arc while the radial reach of the arm is varied to wipe toward the outer corners of the windshield. In one such proposal a wiper arm is slidably mounted on an angularly oscillating carrier and radially projected by a gear driven crank arm. In another proposal, a wiper arm is mounted on an angularly oscillating carrier by a parallelogram linkage and is radially projected by a gear driven crank arm and connecting link arrangement. In still another proposal, a radially shiftable wiper arm on an oscillating carrier is projected between its radial positions by a planetary gear driven crank arm and connecting link arrangement. A vehicle windshield wiper system according to this invention represents an economical alternative to these and other known single arm, variable reach systems.

SUMMARY OF THE INVENTION

Accordingly, the primary feature of this invention is that it provides a new and improved variable reach windshield wiper system for vehicles. Another feature of this invention resides in the provision in the new and improved wiper system of a blade carrying wiper support arm mounted on the vehicle for angular oscillation through a wiping arc and in the provision of a scissors linkage between the wiper arm and the vehicle body responsive to the angular position of the wiper arm to automatically vary the radial reach of the latter. Still another feature of this invention resides in the provision in the new and improved wiper system of a scissors linkage having an anchor pivot at one end whereat the scissors linkage is connected to the vehicle body for pivotal movement about the pivot axis of the wiper arm, a driven pivot at the other end whereat the scissors linkage is connected to the wiper arm, and a control pivot between the anchor and the driven pivots whereat the scissors linkage is connected to a control on the vehicle body which expands and contracts the scissors linkage to extend and retract the wiper arm as a function of the angular position thereof. Still another feature of this invention resides in the provision, in one embodiment of the new and improved wiper system, of a control including a cam on the vehicle body and a cam follower on the scissors linkage at the control pivot thereof. And yet another feature of this invention resides in the provision, in a second embodiment of the new and improved wiper system, of a control including a pinion gear rotatable in a circular orbit about the axis of rotation of the wiper arm, a fixed ring gear engaging the pinion, and a follower on the scissors linkage at the control pivot thereof received in a socket on the pinion gear between the axis of rotation and the outer circumference of the latter.

These and other features of this invention will be readily apparent from the following specification and from the drawings wherein:

FIG. 1 is a fragmentary perspective view of an automobile type vehicle body having a windshield wiping system according to this invention and showing the wiper blade support arm retracted;

FIG. 2 is similar to FIG. 1 but showing the wiper blade support arm extended;

Figure 3:
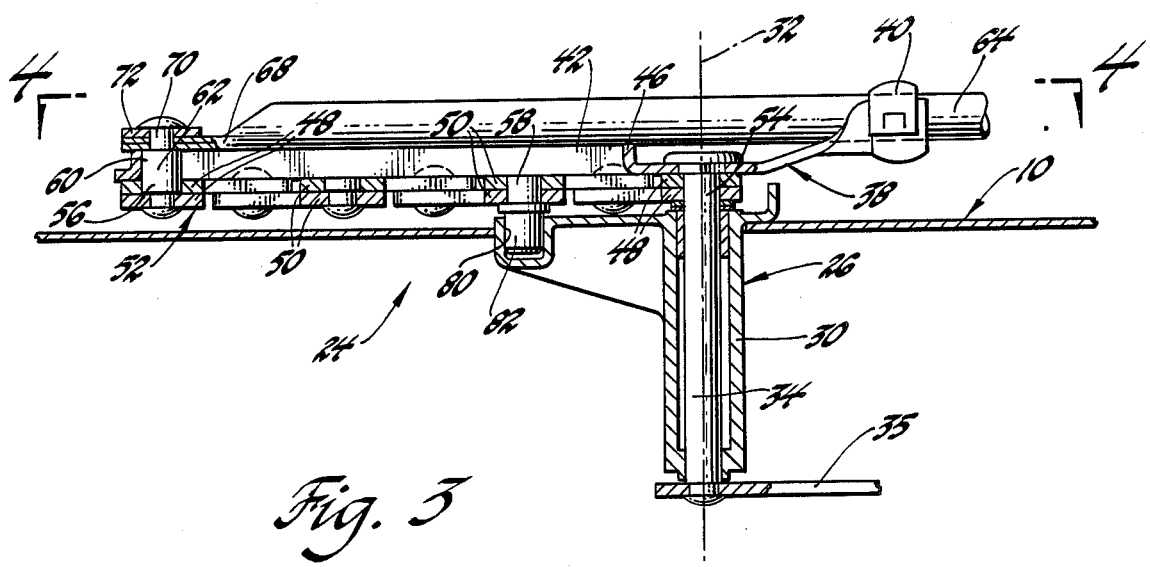
FIG. 3 is an enlarged view taken generally along the plane indicated by lines 3—3 in FIG. 1.
Figure 4:
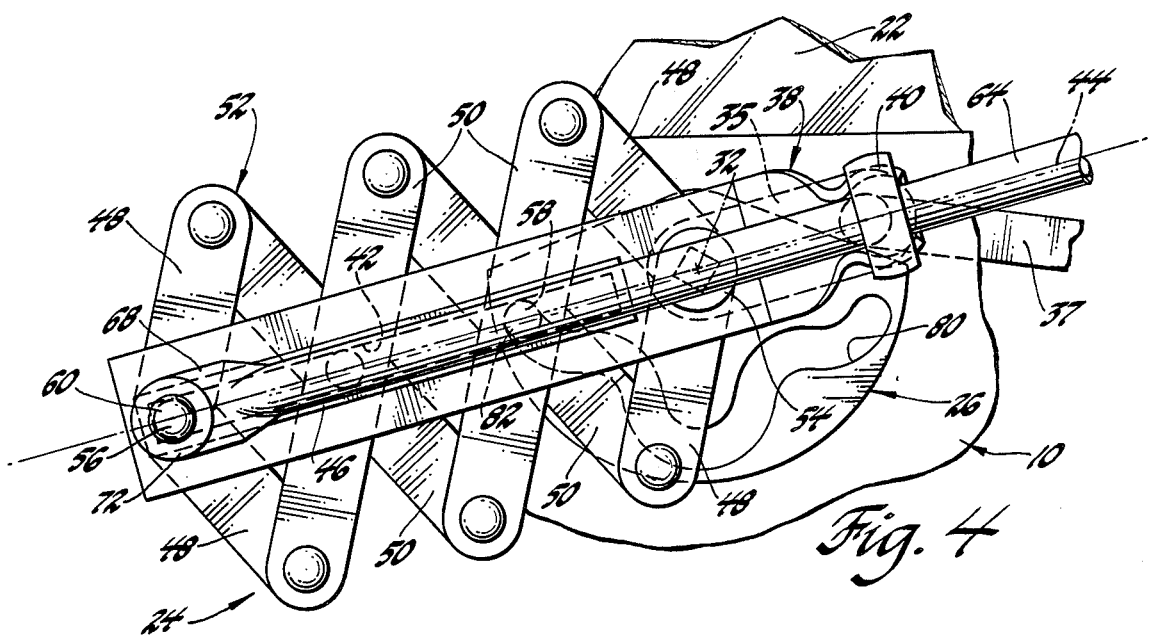
FIG. 4 is a view taken generally along the plane indicated by lines 4—4 in FIG. 3.

Referring now to FIGS. 1 and 2 of the drawings, an automobile-type vehicle body 10 includes a roof 12, a front cowl 14, and a pair of pillars 16 and 18 extending between the cowl and the roof. The roof, cowl and pillars cooperate in defining a generally rectangular windshield opening 20 in which is mounted a glass windshield panel 22. A windshield wiper system 24, according to this invention, is supported on the vehicle body inboard of the cowl 14 and below the center of the windshield 22 by conventional means, not shown, and may be concealed by an additional cowl panel, not shown, or by the rearward edge of the hood of the vehicle. While the invention is described herein as a windshield wiper system, it is equally adaptable to other vehicle windows such as, for example, tailgate windows.

Referring now to FIGS. 1 through 4, the windshield wiper system 24 includes a transmission housing 26 rigidly attached to the vehicle body by conventional means, not shown, having a generally cylindrical journal portion 30 aligned on an axis 32 of the vehicle body generally perpendicular to the windshield at the center thereof. A transmission shaft 34 is aligned on the axis 32 and rotatably supported in the journal portion 30 of the housing with a fragmentarily illustrated drive link 35 rigidly attached to an end thereof projecting outward beyond the journal portion 30. The drive link 35 is connected to a conventional electric motor drive 36 by a transfer link 37 whereby the drive link and attached transmission shaft 34 are angularly rotated or oscillated about the axis 32 through a predetermined included angle referred to hereinafter as the "wipe arc". A generally flat drive plate 38 disposed in a plane perpendicular to the axis 32 is rigidly attached to the transmission shaft 34 at the opposite end thereof from drive link 35 and angularly oscillates as a unit with the transmission shaft about the axis 32 through the wipe arc. The drive plate has a slide bearing 40 thereon and an elongated slot 42 therein, each aligned on an axis 44 of the drive plate perpendicular to and intersecting the axis 32. The slot 42 is bounded on all four sides by an upturned flange 46 projecting from the drive plate in a direction opposite the transmission shaft 34.

A plurality of flat, short links 48 are pivotally connected to a plurality of flat, long links 50 to form a scissors linkage 52 disposed in a plane parallel to the plane of the drive plate 38 and perpendicular to the axis 32. The scissors linkage 52 has an anchor pivot 54 at one end thereof, a driven pivot 56 at the other end thereof, and a control pivot 58 between the anchor and driven pivots. The scissors linkage 52 is rotatably supported at the anchor pivot 54 on the transmission shaft 34 between the drive plate 38 and the housing 26, as by appropriate apertures in converging short links 48 rotatably received on a corresponding cylindrical portion of the transmission shaft. A pivot pin 60 on the scissors linkage 52 at the driven pivot 56 thereof pivotally connects the two outboard short links 48 and includes an enlarged cylindrical body portion 62, FIG. 3, projecting into and closely received in the slot 42 in the drive plate 38. Accordingly, when the drive plate is angularly oscillated about the axis 32 by the drive link 37, the scissors linkage likewise oscillates through the same included angle as a result of the connection defined between the drive plate 38 and the enlarged cylindrical body portion 62 of the pivot pin 60.

A generally cylindrical wiper support arm 64 is aligned on the axis 44 of the drive plate with an intermediate body portion thereof in the slide bearing 40 and with a flattened end 68 thereof connected to a reduced end 70 of the pivot pin 60 projecting above the flange 46 of the drive plate. The flattened end 68 is slidably retained against the upper edge of the flange 46 by a flat washer or like member 72. Accordingly, angular oscillation of the transmission shaft 34 about the axis 32 is transmitted to the support arm 64 through the slide bearing 40 and the pivot pin 60 so that the wiper arm is driven across the windshield 22 through an included angle corresponding to the wipe arc of the shaft 34. A wiper blade 74 is carried on the distal and of support arm 64 and slidably engages the windshield 22 so that as the transmission shaft 34 oscillates through the wipe arc, the wiper blade traverses an included angle bounded on one side by a first lower margin 76 and on the opposite side by a second lower margin 78.

In order to wipe closer to the upper corners of the windshield 22, the radial reach of the arm 64 relative to the axis 32 varies during each stroke between the first and second lower margins 76 and 78. More particularly, the housing 26 includes an outer edge portion defining a cam channel 80 opening toward the scissors linkage 52. A cam follower 82 is slidably received in the channel 80 and is connected to the scissors linkage 52 at the control pivot 58 thereof. The cam channel extends around the axis 32 through an included angle exceeding the wipe arc and with the radial distance between the channel and the axis 32 varying in predetermined fashion. Accordingly, as the transmission shaft 34 angularly oscillates through the wipe arc, the concurrent angular oscillation of the scissors linkage 52 causes the follower 82 to traverse generally the entire length of the channel 80 whereby the radial distance between the follower 82 and the axis 32 is varied. As the follower 82 is thus displaced radially relative to the axis 32, the scissors linkage expands and contracts so that the driven pivot 56 and pivot pin 60 thereat oscillate linearly along the axis 44 of the drive plate 38. As the pivot pin 60 oscillates linearly relative to the drive plate 38, the support arm is radially extended and retracted thereby varying the reach of the arm as it angularly oscillates between the lower margins 76 and 78.

Figure 5:
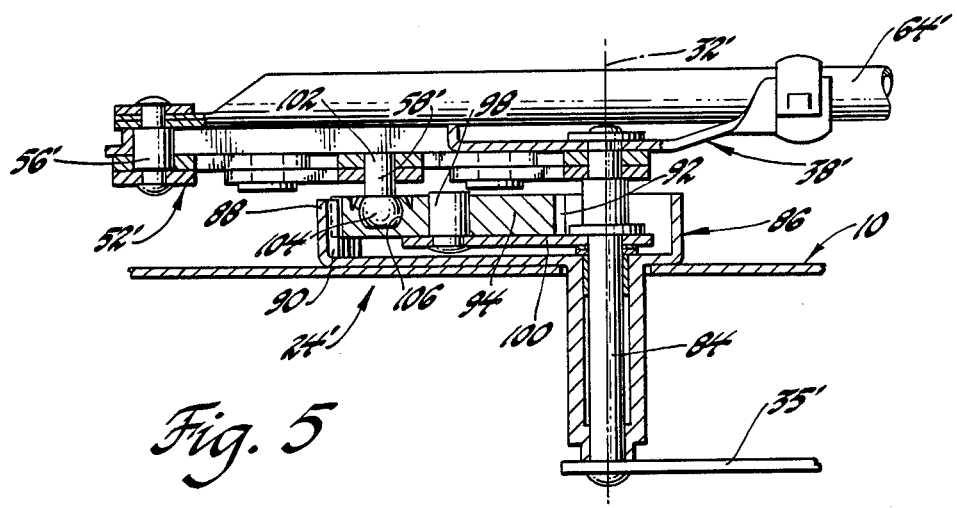
FIG. 5 is similar to FIG. 3 but showing a modified embodiment of the windshield wiper system according to this invention.

Referring now to FIG. 5, a modified embodiment 24' of the windshield wiper system according to this invention includes a scissors linkage 52' and a wiper support arm 64', each identical to the corresponding elements in the windshield wiper system 24 shown in FIGS. 1 through 4. The wiper system 24' further includes a transmission shaft 84 supported on a housing 86 for angular oscillation about an axis 32' of the vehicle body corresponding to the axis 32 described hereinbefore.

The housing 86 has an inturned flange 88 which extends around the axis 32' through an included angle exceeding the wipe arc of the transmission shaft. The inturned flange 88 has a plurality of gear teeth 90 thereon facing the axis 32' which mesh with a plurality of gear teeth 92 on the outer circumference of a pinion gear 94 disposed within the housing 86 below the plane of scissors linkage 52'. The pinion gear 94 is rotatably supported on a pin 98 rigidly attached to the distal end of a flat radius link 100. The radius link 100 is attached to the transmission shaft 84 for angular movement relative thereto in a plane perpendicular to axis 32' so that the pinion gear 94 orbits about the axis 32' at a fixed radius. A follower pin 102 is attached to the scissors linkage 52' at the control pivot 58' thereof and has an enlarged spherical end 104 captured in a socket 106 in the face of the pinion gear adjacent the scissors linkage between the pivot pin 98 and the outer circumference of the gear.

In operation, as the transmission shaft 84 angularly oscillates about the axis 32', the drive plate 38' and support arm 64' are likewise angularly oscillated as a result of the rigid connection of the drive plate to the transmission shaft and the slidable connections between the drive plate and the support arm. Again, the connection between the drive plate 38' and the scissors linkage 52' at the driven pivot 56' of the scissors linkage effects concurrent angular oscillation of the scissors linkage about the axis 32'. As the follower pin 102 on the scissors linkage angularly oscillates with the latter, the gear 94 rolls over the gear teeth 90 causing the follower pin to simultaneously move radially relative to the axis 32' as the socket 106 rotates around the pin 98. Accordingly, as the transmission shaft 84 angularly oscillates, the scissors linkage 52' concurrently expands and contracts thereby radially extending and retracting the support arm 64' to vary the reach thereof.

The embodiments of the invention in which an exclusive property or privilege is claimed are defined as follows:

1. A wiper system for a window on a vehicle body comprising, a transmission shaft disposed on said vehicle body for angular oscillation about an axis of said body through a wipe arc, a plurality of links pivotally connected together to define a scissors linkage having an anchor pivot at one end and a driven pivot at the other end and a control pivot between and colinear with said anchor and said driven pivots, means mounting said scissors linkage at said anchor pivot thereof on said transmission shaft for angular movement relative thereto in a plane perpendicular to said axis, control means on said body engageable on said scissors linkage at said control pivot operative in response to angular movement of said scissors linkage to displace said control pivot radially relative to said anchor pivot whereby said driven pivot is proportionately radially displaced in the same direction, a support arm having a wiper thereon engaging said window, means mounting said support arm on said transmission shaft perpendicular to and intersecting said first axis for angular oscillation therewith whereby said wiper is moved across said window through said wipe arc and for longitudinal bodily shiftable movement relative thereto whereby the reach of said wiper is varied, and means connecting said scissors linkage at said driven pivot thereof to said support arm so that said scissors linkage moves angularly about said axis with said support arm while radially displacing the latter to vary the reach of said wiper.

2. The combination recited in claim 1 wherein said means mounting said arm on said transmission shaft includes a drive plate rigidly attached to said transmission shaft, a first support bearing on said drive plate on one side of said axis of said body engaging said arm and limiting movement thereof relative to said drive plate to longitudinal bodily shiftable movement in said plane perpendicular to said axis of said body, and a second support bearing on said drive plate on the other side of said axis of said body engaging said arm and limiting movement thereof relative to said drive plate to longitudinal bodily shiftable movement in said plane perpendicular to said body axis.

3. The combination recited in claim 2 wherein said control means on said body engageable on said scissors linkage includes a guide on said body defining a guide path in a plane perpendicular to said axis of said body having varying radial distance from said axis of said body, and follower means on said scissors linkage at said control pivot engageable on said guide and constrained by the latter for radial movement relative to said axis of said body during angular movement of said scissors linkage.

4. The combination recited in claim 2 wherein said control means on said body engageable on said scissors linkage includes a ring gear on said body centered on said axis of said body, a pinion gear engaging said ring gear, a radius link rotatable about said axis of said body relative to said transmission shaft in a plane perpendicular to said axis of said body, means rotatably supporting said pinion gear on said radius link, a follower on said scissors linkage at said control pivot, and means rotatably connecting said follower to said pinion gear between the axis of rotation of the latter relative to said radius link and the outer circumference thereof.

* * * * *